May 1, 1923.
G. CARSTENS
UNIVERSAL CONVEYER CHAIN
Filed Nov. 5, 1921
1,453,702
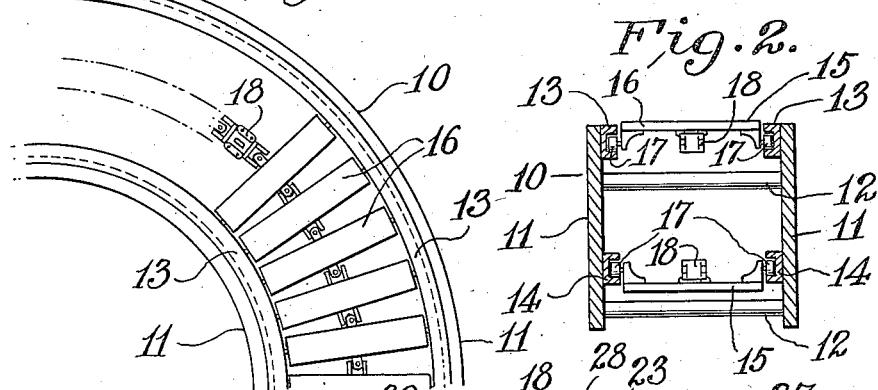
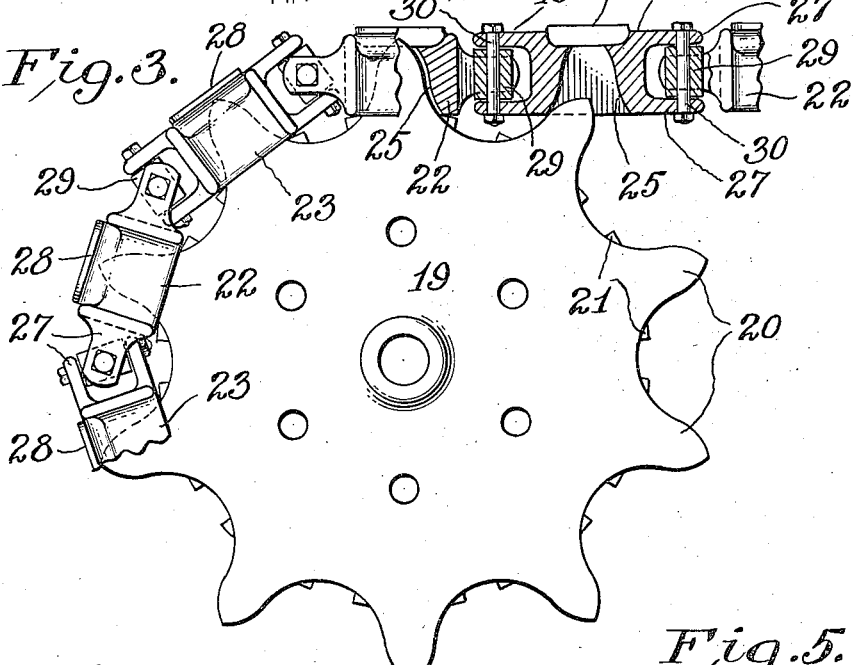
Inventor
George Carstens
By his Attorneys
Edgar Tate & Co Patented May 1, 1923.

1,453,702

UNITED STATES PATENT OFFICE.

GEORGE CARSTENS, OF JERSEY CITY, NEW JERSEY, ASSIGNOR OF ONE-FOURTH TO HAROLD E. MULLER, OF JERSEY CITY HEIGHTS, NEW JERSEY.

UNIVERSAL CONVEYER CHAIN.

Application filed November 5, 1921. Serial No. 512,968.

*To all whom it may concern:*

Be it known that I, GEORGE CARSTENS, a citizen of the United States, and residing at Jersey City, in the county of Hudson and State of New Jersey, have invented certain new and useful Improvements in Universal Conveyer Chains, of which the following is a specification, such as will enable those skilled in the art to which it appertains to make and use the same.

This invention relates to chains for use in connection with conveying systems of various kinds and classes, and particularly to conveyers which are curved to round corners or to change the direction of travel of the conveyer proper, and the object of the invention is to provide a chain construction for conveyers of the class specified in connection with which the usual wood or steel flights are mounted, and said chain being composed of links universally connected together whereby said flights may be readily moved around corners or curves in conveying articles of various kinds and classes from one point to another; and with this and other objects in view the invention consists in a chain of the class and for the purpose specified which is simple in construction and efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic view showing a part of a conveyer made according to my invention and indicating the position of the flights of the conveyer chain rounding a corner;

Fig. 2 a diagrammatic sectional view through the conveyer shown in Fig. 1 and showing the method of supporting the flights in suitable tracks or runways;

Fig. 3 a side view of a drive sprocket which I employ and showing a part of my improved conveyer chain mounted thereon with part of said chain in section;

Fig. 4 a detail plan view of a part of a conveyer chain with part of the construction broken away and in section; and Fig. 5 a perspective view of one of the links of my improved conveyer chain.

For the purpose of illustrating one use of my invention, I have shown in Figs. 1 and 2 of the drawing a small part of a conveyer apparatus 10 which, in the construction shown, comprises side walls 11 joined by brace rods or the like 12 to form the framework of the apparatus, and mounted on the inner faces of the side walls 11 at the top thereof are channel rails 13 and similar rails 14 are secured to the inner faces of said walls adjacent to the bottom thereof, and the conveyer proper 15 is adapted to move longitudinally of the channel rails 13 and 14 in the usual or any desired manner, the conveyer 15 being composed of a plurality of equally spaced flights 16, as indicated in Fig. 1, provided at their opposite ends with rollers 17 which operate in the channel rails 13 and 14 and are guided thereby, and the flights 16 are spaced and operated by a universal chain construction 18 shown in detail in Figs. 3, 4 and 5, which chain is driven at predetermined points by a drive sprocket 19 as shown in Fig. 3, said sprocket being provided with a plurality of projecting teeth 20 at the opposite sides of each of which are shoulder portions 21.

The chain 18 is composed of a plurality of links universally mounted in connection with each other, and is composed of two types of links 22 and 23 which are alternately arranged, as clearly shown in Figs. 3 and 4 of the drawing. The links 22 and 23 are of the same general construction and are composed of a central body portion 24 having a tooth recess 25 therein adapted to receive the teeth 20 of the sprocket 19, as clearly shown in Fig. 3, at the opposite sides of the central body portion are approximately rectangular portions 26 having two projecting members 27 which form fork-shaped or yoke-shaped ends to the separate links 22 and 23, and the only difference between the links 22 and the links 23 lies in the fact that the link 22 is provided with two apertured members 28 arranged as shown at the left of Fig. 4 of the drawing, or in a plane common to that of the yoke-shaped ends of the link, while the similar members 28 of the link 23 are arranged at right angles to the yoke-shaped ends of the link as shown at the right of Fig. 4 of the drawing, and these members 28 on both links 22 and 23 are located at the outer faces of said links and provide means whereby the flights 16 may be secured thereto.

It will be apparent that the purpose of arranging the members 28, as above set out, is to facilitate the coupling of the adjacent link members 22 and 23 with each other with the yoke-shaped ends thereof at right angles to each other, and in coupling the links together, I provide coupling blocks 29, and bolts 30 pass through said blocks and through the members 27 of the yoke-shaped ends of one set of links, the links, 23, in the construction shown while studs 31 are mounted in the members 27 of the yoke-shaped ends of the links 22, said studs being provided with trunnions which extend into apertures 32 and the coupling blocks 29, and this construction forms a universal connection of the separate links of the chain one with another, the links 23 being adapted to rotate upon the bolts 30, while the links 22 are rotatably mounted in the blocks 29.

It will be apparent that I am not necessarily limited to the use of a bolt for coupling one of the links with the coupling block and the use of studs in the other case, as studs may be used in both cases, if desired, and it will also be noted that in the operation of the chain 18, or the separate links 22—23 thereof, over the sprocket wheel 19 that the rectangular end portions 26 of the links are adapted to rest upon the seats 21 at the opposite sides of the teeth 20 of said sprocket as clearly shown in Fig. 3 of the drawing.

It will also be apparent that while I have shown one method of carrying my invention into effect, that I am not necessarily limited in this respect, nor am I limited to the form and construction of the members 28, as said members may be modified in form to suit the particular attachment which is to be connected with, or mounted in connection with the links of the chain, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A chain of the class described composed of two sets of links alternately arranged and universally coupled together to form a complete chain, the separate links being of approximately the same form and construction and provided on one face thereof with means whereby predetermined devices may be mounted in connection therewith, the other faces of said links being provided with recesses adapted to receive the teeth of a drive wheel or sprocket.

2. A chain of the class described composed of two sets of links alternately arranged and coupled together to form a complete chain, coupling blocks for universally coupling the separate links together, the separate links being of approximately the same form and construction and provided on one face thereof with laterally directed attaching plates, and the other faces of said links being provided with tooth recesses.

3. A chain of the class described composed of a plurality of links of approximately the same form and construction, the end portions of said links being yoke-shaped in form, blocks for coupling the separate links together, means passed through the yoke-shaped ends of said links and into said blocks for universally coupling said links together, and means in the outer faces of said links whereby predetermined devices may be secured thereto.

4. A chain of the class described composed of a plurality of links of approximately the same form and construction, the end portions of said links being yoke-shaped in form, blocks for coupling the separate links together, means passed through the yoke-shaped ends of said links and into said blocks for universally coupling said links together, and means in the outer faces of said links whereby predetermined devices may be secured thereto, and the inner faces of said links being provided with recesses.

5. A chain of the class described composed of a plurality of links of approximately the same form and construction, the end portions of said links being yoke-shaped in form, blocks for coupling the separate links together, means passed through the yoke-shaped ends of said links and into said blocks for universally coupling said links together, and means whereby flights may be secured to the outer faces of said links.

6. A chain of the class described composed of a plurality of links of approximately the same form and construction, the end portions of said links being yoke-shaped in form, blocks for coupling the separate links together, means passed through the yoke-shaped ends of said links and into said blocks for universally coupling said links together, and means whereby flights may be secured to the outer faces of said links, and the inner faces of said links being provided with recesses adapted to receive the teeth of a sprocket or drive wheel.

7. A drive chain for conveyers, said chain being composed of a plurality of links of approximately the same form and construction, the end portions of said links being yoke-shaped in form, blocks for coupling the separate links together, means passed through the yoke-shaped ends of said links and into said blocks for universally coupling said links together, means whereby flights may be secured to the outer faces of said links to form a conveyer proper and the inner faces of said links being provided with recesses adapted to receive the teeth of a sprocket or drive wheel.

8. A chain of the class described composed of a plurality of sets of links alternately arranged and interlocked one with the other to form said chain, one set of links being provided with yoke-shaped end portions arranged at right angles to similar yoke-shaped end portions of the other set of links, and means for universally coupling the separate links of each set.

9. A chain of the class described composed of a plurality of sets of links alternately arranged and interlocked one with the other to form said chain, one set of links being provided with yoke-shaped end portions arranged at right angles to similar yoke-shaped end portions of the other set of links, means for universally coupling the separate links of each set, and all of said links being provided on the inner faces thereof with tooth apertures in connection with which the teeth of a drive sprocket are adapted to operate.

10. A chain of the class described composed of a plurality of sets of links alternately arranged and interlocked one with the other to form said chain, one set of links being provided with yoke-shaped end portions arranged at right angles to similar yoke-shaped end portions of the other set of links, means for universally coupling the separate links of each set, all of said links being provided on the inner faces thereof with tooth apertures in connection with which the teeth of a drive sprocket are adapted to operate and the outer faces of said links being provided with longitudinally arranged and flat faces provided with apertures.

11. A chain of the class described composed of a plurality of sets of links alternately arranged and interlocked one with the other to form said chain, one set of links being provided with yoke-shaped end portions arranged at right angles to similar yoke-shaped end portions of the other set of links, means for universally coupling the separate links of each set, all of said links being provided on the inner faces thereof with tooth apertures in connection with which the teeth of a drive sprocket are adapted to operate, the outer faces of said links being provided with longitudinally arranged and flat faces provided with apertures, and flights adapted to be secured to the outer faces of said links.

In testimony that I claim the foregoing as my invention I have signed my name in presence of the subscribing witnesses this 3rd day of November, 1921.

GEORGE CARSTENS.